(12) United States Patent
Kong et al.

(10) Patent No.: US 12,549,583 B2
(45) Date of Patent: Feb. 10, 2026

(54) ELECTRONIC APPARATUS FOR PERFORMING LOG LIGHTWEIGHTING USING EXTENDED BLOOM FILTER, AND OPERATION METHOD THEREOF

(71) Applicant: Ahnlab, Inc., Seongnam-si (KR)

(72) Inventors: Icksun Kong, Yongin-si (KR); Subin Park, Seongnam-si (KR); Hyunsook Jang, Seongnam-si (KR)

(73) Assignee: Ahnlab, Inc., Seongnam-si (KR)

( * ) Notice: Subject to any disclaimer, the term of this patent is extended or adjusted under 35 U.S.C. 154(b) by 0 days.

(21) Appl. No.: 19/268,121

(22) Filed: Jul. 14, 2025

(65) Prior Publication Data
US 2026/0019437 A1   Jan. 15, 2026

(30) Foreign Application Priority Data
Jul. 15, 2024   (KR) .......... 10-2024-0093275

(51) Int. Cl.
*H04L 9/40*   (2022.01)

(52) U.S. Cl.
CPC .................. *H04L 63/1425* (2013.01)

(58) Field of Classification Search
CPC .......... H04L 63/1425; H04L 63/1416; H04L 63/1441; H04L 63/20; H04L 63/1433; G06F 21/554; G06F 11/3476
See application file for complete search history.

(56) References Cited

U.S. PATENT DOCUMENTS

| | | | | |
|---|---|---|---|---|
| 8,037,476 B1* | 10/2011 | Shavit | ........... | G06F 9/526 712/228 |
| 8,850,263 B1* | 9/2014 | Yourtee | ........... | G06F 11/3476 714/20 |
| 9,092,447 B1* | 7/2015 | Anderson | ........ | G06Q 30/0185 |
| 11,057,414 B1* | 7/2021 | Giorgio | .......... | H04L 63/1425 |

(Continued)

FOREIGN PATENT DOCUMENTS

| KR | 10-1540343 B1 | 8/2015 |
|---|---|---|
| KR | 10-1701310 B1 | 2/2017 |

(Continued)

OTHER PUBLICATIONS

Shao et al., "Low-Latency Dimensional Expansion and Anomaly Detection Empowered Secure IoT Network," IEEE Transactions on Network and Service Management Year: 2023 | vol. 20, Issue: 3 | Journal Article | Publisher: IEEE.*

Shao et al., "Low-Latency Dimensional Expansion and Anomaly Detection Empowered Secure IoT Network," IEEE Transactions on Network and Service Management Year: 2023 | vol. 20, Issue: 3 | Journal Article | Publisher: IEEE.*

(Continued)

*Primary Examiner* — Roderick Tolentino
(74) *Attorney, Agent, or Firm* — NSIP Law (57) ABSTRACT

An operation method of an electronic apparatus is disclosed. The operation method according to the present disclosure comprises extracting item-specific data that matches a plurality of preconfigured items from within log data, applying the extracted item-specific data to a hash function corresponding to each item to obtain an item-specific hash value and checking for duplication of the log data based on whether the item-specific hash value is duplicated, updating a duplication count based on the checked duplication status, and detecting a threat based on the identified item-specific data and the updated duplication count.

6 Claims, 7 Drawing Sheets

(56) References Cited

U.S. PATENT DOCUMENTS

| | | | | |
|---|---|---|---|---|
| 2016/0253425 | A1* | 9/2016 | Stoops | G06F 16/2255 |
| | | | | 707/754 |
| 2018/0232488 | A1* | 8/2018 | Jafer | G06F 21/6254 |
| 2019/0347360 | A1* | 11/2019 | Bortnikov | G06F 16/9535 |
| 2020/0099721 | A1* | 3/2020 | Golan | H04L 63/20 |
| 2021/0226974 | A1* | 7/2021 | Hirano | H04L 12/40169 |
| 2022/0405160 | A1* | 12/2022 | Datar | G06F 11/3409 |

FOREIGN PATENT DOCUMENTS

| | | |
|---|---|---|
| KR | 10-1787900 B1 | 11/2017 |
| KR | 10-2019-0109151 A | 9/2019 |
| KR | 10-2022-0077184 A | 6/2022 |
| KR | 10-2780773 B1 | 6/2022 |
| KR | 10-2598126 B1 | 11/2023 |

OTHER PUBLICATIONS

Thang et al., "Synflood Spoofed Source DDoS Attack Defense Based on Packet ID Anomaly Detection with Bloom Filter," 2018 5th Asian Conference on Defense Technology (ACDT) Year: 2018 | Conference Paper | Publisher: IEEE.*

Atifi et al., "On correlating network traffic for cyber threat intelligence: A Bloom filter approach," 2017 13th International Wireless Communications and Mobile Computing Conference (IWCMC) Year: 2017 | Conference Paper | Publisher: IEEE.*

Korean Office Action on Sep. 20, 2024 in corresponding Korean Patent Application No. 319999028822 (6 pages in English, 7 pages in Korean).

Korean Office Action on Mar. 4, 2025 in corresponding Korean Patent Application No. 319999028822 (3 pages in English, 2 pages in Korean).

* cited by examiner

ELECTRONIC APPARATUS FOR PERFORMING LOG LIGHTWEIGHTING USING EXTENDED BLOOM FILTER, AND OPERATION METHOD THEREOF

CROSS-REFERENCE TO RELATED APPLICATION(S)

This application claims the benefit under 35 USC 119(a) of Korean Patent Application No. 10-2024-0093275, filed with the Korean Intellectual Property Office on Jul. 15, 2024, the disclosure of which is incorporated herein by reference in its entirety.

BACKGROUND

Field

The present disclosure relates to a method or a system for operating an electronic apparatus that performs rule-based threat detection based on log data, and more particularly, to an electronic apparatus or a system that lightens log data using an extended bloom filter.

Description of Related Art

In the process of collecting and processing logs, a method which first loads raw data into storage, removes duplicates at regular intervals from the accumulated data, and detects threats through a rule engine is employed; however, in this case, since the data is retrieved after being stored, there may be a significant delay in data processing.

When stream processing of log data and a memory cache (or a database) are used to remove duplicates, the delay time may not be significant; however, in the case of data with high cardinality, the memory or database size required for duplicate removal increases; moreover, performance degradation may occur due to the duplicate checks, and information on the number of filtered logs may be lost, which may pose a problem when detecting threats based on their quantitative scale.

SUMMARY

The present disclosure provides an electronic apparatus and an operation method thereof, which may improve the efficiency of computing resources used for log processing (rule engine-based examination) by compressing/filtering duplicate logs while collecting a large volume of log data and minimize the amount of information that may be lost during the process of compressing and filtering the log data, thereby preventing detection failures (false negative).

Technical objects of the present disclosure are not limited to those described above. Other technical objects and advantages of the present disclosure not mentioned above may be understood from the descriptions given below and more clearly understood by the embodiments of the present disclosure. Also, it should be easily understood that the technical objects and advantages of the present disclosure may be implemented by the means described in the appended claims and a combination thereof.

An operation method of an electronic apparatus according to one embodiment of the present disclosure comprises extracting item-specific data that matches a plurality of preconfigured items from within log data, applying the extracted item-specific data to a hash function corresponding to each item to obtain an item-specific hash value and checking for duplication of the log data based on whether the item-specific hash value is duplicated, updating a duplication count based on the checked duplication status, and detecting a threat based on the identified item-specific data and the updated duplication count.

The checking for duplication of the log data may determine the log data as duplicated if each of the hash values of the plurality of items that constitute the log data is identified as matching a pre-stored item-specific hash value of at least one prior log data.

The checking for duplication of the log data may input item-specific data corresponding to each of the plurality of items that constitute the log data into an extended Bloom filter in which an item-specific hash value of at least one prior log data may be stored and identify the duplication status of the log data based on whether the item-specific hash value is duplicated. The updating of the duplication count may count the number of times the log data, identified through the extended Bloom filter, is duplicated within a predetermined period.

The extended Bloom filter may include hash functions to be applied to each of the plurality of preconfigured items according to detection rules related to threat detection.

Meanwhile, if each of the hash values of the plurality of items that constitute the log data is identified as not matching any pre-stored item-specific hash value of at least one prior log data, the operation method of the electronic apparatus may include setting the duplication count of the log data to one and storing the hash value of each of the plurality of items in the extended Bloom filter.

Here, the detecting of the threat may detect a threat based on the log data and the duplication count of the log data when a time point set according to a predetermined period is reached.

Also, the operation method of the electronic apparatus may include, when a time point set according to the predetermined period is reached, returning the duplication count of the log data within the extended Bloom filter and deleting the hash value of each of the plurality of items that constitute the log data.

A system according to one embodiment of the present disclosure comprises a normalization module that extracts item-specific data matching a plurality of preconfigured items from log data; a log compression module that applies the extracted item-specific data to hash functions corresponding to each item to obtain item-specific hash values, checks for duplication of the log data based on whether the item-specific hash values are duplicated, and updates a duplication count based on the determined duplication status; and a threat detection module that detects threats based on the identified item-specific data and the updated duplication count.

The electronic apparatus or system according to the present disclosure may perform normalization of log data and duplicate removal or duplicate counting based on an extended Bloom filter, thereby enabling processing of a larger volume of data and threat detection using the same computing resources.

DETAILED DESCRIPTION

Prior to a detailed description of the present disclosure, a description method employed in the present disclosure and appended drawings will be provided.

First, the terms used in the present disclosure and appended claims were selected from general terms in consideration of the functions of the present disclosure in various embodiments. However, these terms may vary depending on the intention of a person skilled in the art, legal or technical interpretations, or the emergence of new technologies. Additionally, some terms may have been arbitrarily selected by the applicant. These terms may be interpreted according to the definitions provided in the present disclosure; unless specifically defined, they may be interpreted based on the overall context of the present disclosure and common technical knowledge in the relevant technical field.

Also, the same reference numerals or symbols described in the accompanying drawings of the present disclosure represent parts or constituting elements that perform substantially the same function. For the convenience of description and understanding, the same reference numerals or symbols are used across different embodiments. In other words, even if constituting elements with the same reference numeral are shown in a plurality of drawings, it does not indicate that the plurality of drawings represent the same embodiment.

Also, in the present disclosure and appended claims, ordinal terms such as "first", "second", and so on may be used to distinguish between constituting elements. These ordinals are used merely to differentiate similar constituting elements and should not be construed as limiting the meaning of the terms. For example, the use of the ordinals should not be understood as limiting the order of use or placement of the constituting elements associated therewith. If necessary, the ordinals may be used interchangeably.

In the present disclosure, singular expressions may include plural meanings unless the context clearly indicates otherwise. In the present disclosure, the term such as "include" or "comprise" is intended to specify the presence of features, numbers, steps, operations, constituting elements, parts, or combinations thereof but should not be interpreted as precluding the presence or addition of one or more other features, numbers, steps, operations, constituting elements, parts, or combinations thereof.

In the embodiments of the present disclosure, terms such as "module", "unit", or "part" refer to constituting elements that perform at least one function or operation, and the constituting elements may be implemented in hardware, software, or a combination of hardware and software. Moreover, unless specifically required to be implemented as separate hardware, a plurality of "modules", "units", or "parts" may be integrated into at least one module or chip and implemented by at least one processor.

Also, in the embodiments of the present disclosure, when a part is described as being connected to another part, it includes not only a direct connection but also indirect connections via other media. Furthermore, unless otherwise explicitly stated, if a particular element is said to include some particular element, it means that the former may further include other particular elements rather than exclude them.

Figure 1:
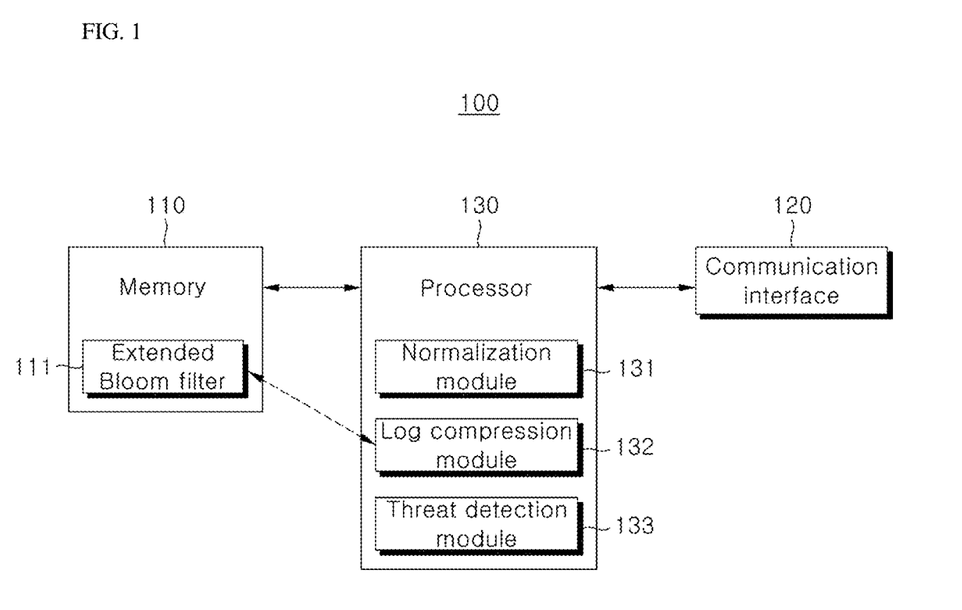
FIG. 1 is a block diagram illustrating the structure of an electronic apparatus according to one embodiment of the present disclosure.

FIG. 1 is a block diagram illustrating the structure of an electronic apparatus according to one embodiment of the present disclosure.

The electronic apparatus 100 may be implemented as an apparatus or a system comprising at least one computer configured to perform at least one of collection, monitoring, and threat detection of log data related to various target systems. The target system may correspond to various entities or groups such as individuals, enterprises, or organizations and may further correspond to a system environment composed of one or more electronic apparatus or facilities.

For example, the electronic apparatus 100 may be implemented as a server, a gateway, a firewall apparatus, or a routing apparatus, implemented as a POS system, a payment device, a vehicle terminal, a smart appliance, a desktop PC, a notebook PC, a smartphone, a tablet PC, or a console, or implemented as various other devices.

Referring to FIG. 1, the electronic apparatus 100 may comprise a memory 110, a communication interface 120, a processor 130.

The memory 110 is configured to store an operating system (OS) for controlling the overall operation of the constituting elements of the electronic apparatus 100 and at least one instruction or data related to constituting elements of the electronic apparatus 100.

The memory 110 may include a non-volatile memory such as a ROM or a flash memory and include a volatile memory comprising a DRAM. Also, the memory 110 may include an auxiliary storage device such as a hard disk or a solid state drive (SSD).

Also, the memory may include a memory cache, and the memory cache may be implemented as at least one of the DRAM, flash memory, and SRAM.

Referring to FIG. 1, the memory 110 may store the extended Bloom filter 111. The extended Bloom filter 111 is a filter aimed to periodically count the number of duplications by checking for the duplication of log data and has an improved form of the conventional Bloom filter.

The extended Bloom filter 111 may store an item-specific hash value of at least one prior log data, and the stored hash value of each log data may be deleted in each period. The extended Bloom filter 111 may be stored in the memory cache as part of the internal structure of the memory 110, but the present disclosure is not limited to the specific structure.

The communication interface 120 may be connected to an external server and/or a terminal device through one or more networks and may exchange data through a wired or wireless communication method.

The network may be a personal area network (PAN), a local area network (LAN), or a wide area network (WAN) depending on the application area or scale of the network; depending on the openness of the network, it may be implemented as intranet, extranet, or Internet.

The wireless communication may include at least one of communication methods such as Long-Term Evolution (LTE), LTE Advance (LTE-A), 5th Generation (5G) mobile communication, Code Division Multiple Access (CDMA), wideband CDMA (wCDMA), Universal Mobile Telecommunications System (UMTS), Wireless Broadband (WiBro), Global System for Mobile Communications (GSM), Time Division Multiple Access (TDMA), Wi-Fi (WiFi), WiFi Direct, Bluetooth, Near Field Communication (NFC), and Zigbee.

The wired communication may include at least one of communication methods such as Ethernet, optical network, Universal Serial Bus (USB), and ThunderBolt.

Meanwhile, the communication method is not limited to the examples above but may include communication methods emerging as the technology advances.

The electronic apparatus 100 may access at least one network environment and obtain log data. Specifically, the electronic apparatus 100 may receive log data of at least one external electronic apparatus or external terminal through the communication interface 120. Also, the electronic apparatus 100 may collect log data generated on the electronic apparatus 100.

The processor 130 is configured to control the overall structure or operation.

The processor 130 may control the electronic apparatus 100 by being connected to the memory 110 and executing at least one instruction stored in the memory 110.

To this purpose, the processor 130 may be implemented as a general-purpose processor such as the Central Processing Unit (CPU) or Application Processor (AP), a graphics processor such as the Graphic Processing Unit (GPU) or Vision Processing Unit (VPU), and an artificial intelligence processor such as the Neural Processing Unit (NPU). The processor 130 may include a volatile memory such as the SRAM.

If the method according to one embodiment of the present disclosure includes a plurality of operations, the plurality of operations may be performed by one processor 130 or a plurality of processors 130 included in the electronic apparatus 100. For example, when a first operation, a second operation, and a third operation are performed by the method according to one embodiment, all the first, second, and third operations may be performed by a first processor while the first and second operations may be performed by the first processor (e.g., a general-purpose processor), and the third operation may be performed by a second processor (e.g., an artificial intelligence processor).

One or more processors 130 may be implemented as a single core processor consisting of a single core or implemented as a multicore processor consisting of a plurality of cores (e.g., homogeneous multicores or heterogeneous multicores). When one or more processors 130 are implemented as a multicore processor, each of the plurality of cores included in the multicore processor may include an in-processor memory such as an on-chip memory 110, and a common cache shared by the plurality of cores may be included in the multicore processor 130. Also, each of the plurality of cores included in the multicore processor 130 (or part of the plurality of cores) may independently interpret and execute program commands for implementing the method according to one embodiment of the present disclosure or the entire (or part) of the plurality of cores may be associated with each other to interpret and execute program commands for implementing the method according to one embodiment of the present disclosure.

When the method according to one embodiment of the present disclosure includes a plurality of operations, the plurality of operations may be performed by one of the plurality of cores included in the multicore processor or by the plurality of cores. For example, when the first, second, and third operations are performed by the method according to one embodiment, all of the first, second, and third operations may be performed by a first core included in the multicore processor while the first and second operations may be performed by the first core included in the multicore processor, and the third operation may be performed by a second core included in the multicore processor.

In the embodiments of the present disclosure, the processor 130 may indicate one or more processors 130 and a System-on-Chip (SoC) integrated with miscellaneous electronic components, a single-core processor, a multicore processor, or a core included in the single-core processor or multicore processor, where the core may be implemented as a CPU, a GPU, an APU, a DSP, an NPU, a hardware accelerator, or a machine learning accelerator, but the embodiments of the present disclosure are not limited to the specific examples above.

Referring to FIG. 1, the processor 130 may control various modules including the normalization module 131, a log compression module 132, and a threat detection module 133. Each of the present modules corresponds to a functional unit that may be implemented as hardware and/or software.

The normalization module 131 is configured to extract data for each of a plurality of preconfigured items through normalization of log data. For example, the normalization module 131 may generalize various log data in different formats to conform to a standardized format.

In one embodiment, the normalization module 131 may divide the log data, which are collected in real-time based on various pieces of unique information such as a unique value (e.g., key), date and time, user information, IP address, protocol, and firewall result; event information; and status information, according to the respective items; however, the present disclosure is not limited to the specific embodiment.

The log compression module 132 is configured to remove the duplication within repeated log data and perform log compression.

Specifically, the log compression module 132 may determine the presence of duplication for each item of log data normalized by the normalization module 121 and detect the duplication within the log data. At this time, the log compression module 132 may determine the duplication of the log data based on the extended Bloom filter 111 and update the duplication count. Also, the log compression module 132 may calculate the duplication count for each log data as the duplication of the log data is determined.

The extended Bloom filter 111 according to one embodiment of the present disclosure enables duplicate checking using a memory space much less than the cardinality space (i.e., the total number of unique values) of the log data. The extended Bloom filter 111 of the present disclosure may check the hash value obtained by applying a hash function to each item of the log data and determines the hash value to be duplicate if hash values of all items match the pre-stored prior log data or identify the log data as a new value not previously encountered, otherwise.

The threat detection module 133 is a module for detecting a threat through log data. Specifically, the threat detection module 133 may be module intended to perform rule-based detection against various items constituting the log data; at this time, at least one artificial intelligence model may be applied to the creation, update, and application of the rules, but the present disclosure is not limited to the specific description.

The threat detection module 133 may detect a threat based on the information condensed through the log compression module 132 (log data, duplication count, and so on); at this time, it is possible to perform rule-based threat detection based on unit log data and duplication count rather than the entire data including repeated log data, which brings an advantageous effect of minimizing the computational loads.

Related to the description above, the extended Bloom filter 111 may include hash functions to be applied to each of the plurality of preconfigured items according to the detection rules related to the threat detection of the threat detection module 133. Moreover, since the plurality of preconfigured items may be matched to the respective items of the log data extracted from the normalization process performed by the normalization module 111, a series of processes including normalization, compression (duplication count), and threat detection may be effectively performed based on a minimal set of items required for rule-based threat detection.

In what follows, the present disclosure will be described in more detail with reference to appended drawings.

Figure 2:
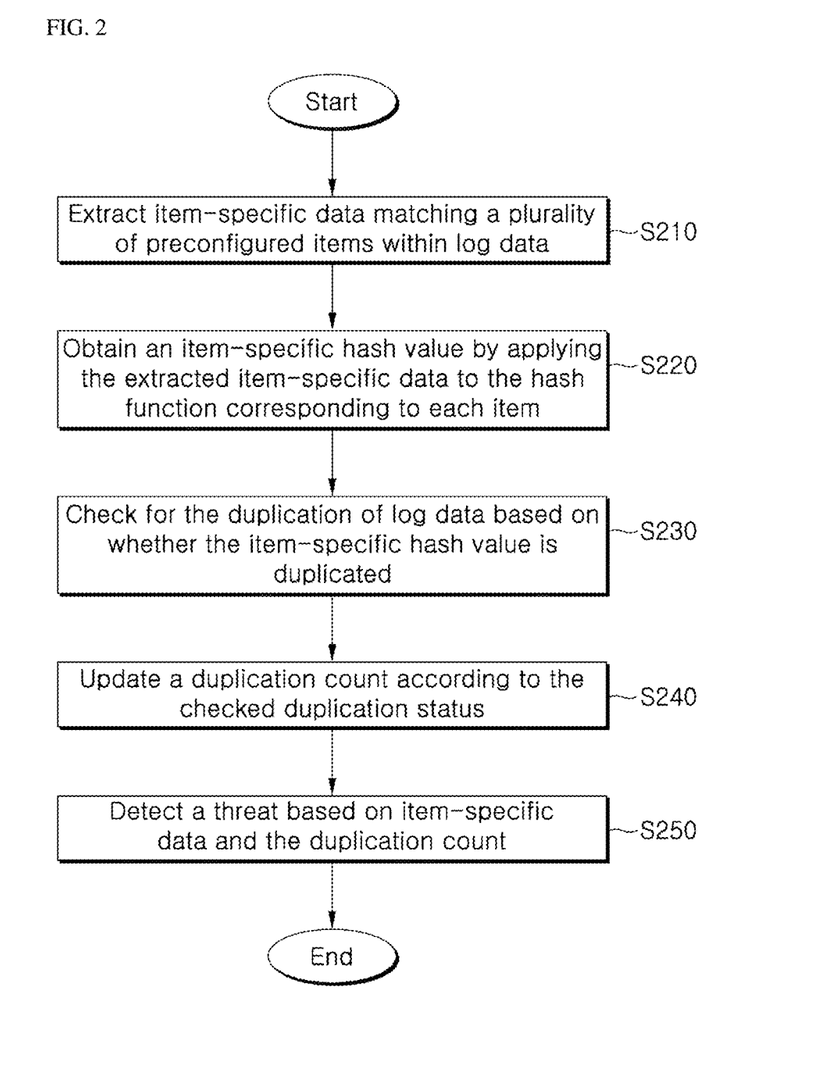
FIG. 2 is a flow diagram illustrating the operation of an electronic apparatus according to one embodiment of the present disclosure.

FIG. 2 is a flow diagram illustrating the operation of an electronic apparatus according to one embodiment of the present disclosure.

Referring to FIG. 2, the normalization module 131 may extract item-specific data matching a plurality of preconfigured items within the log data S210.

Figure 3:
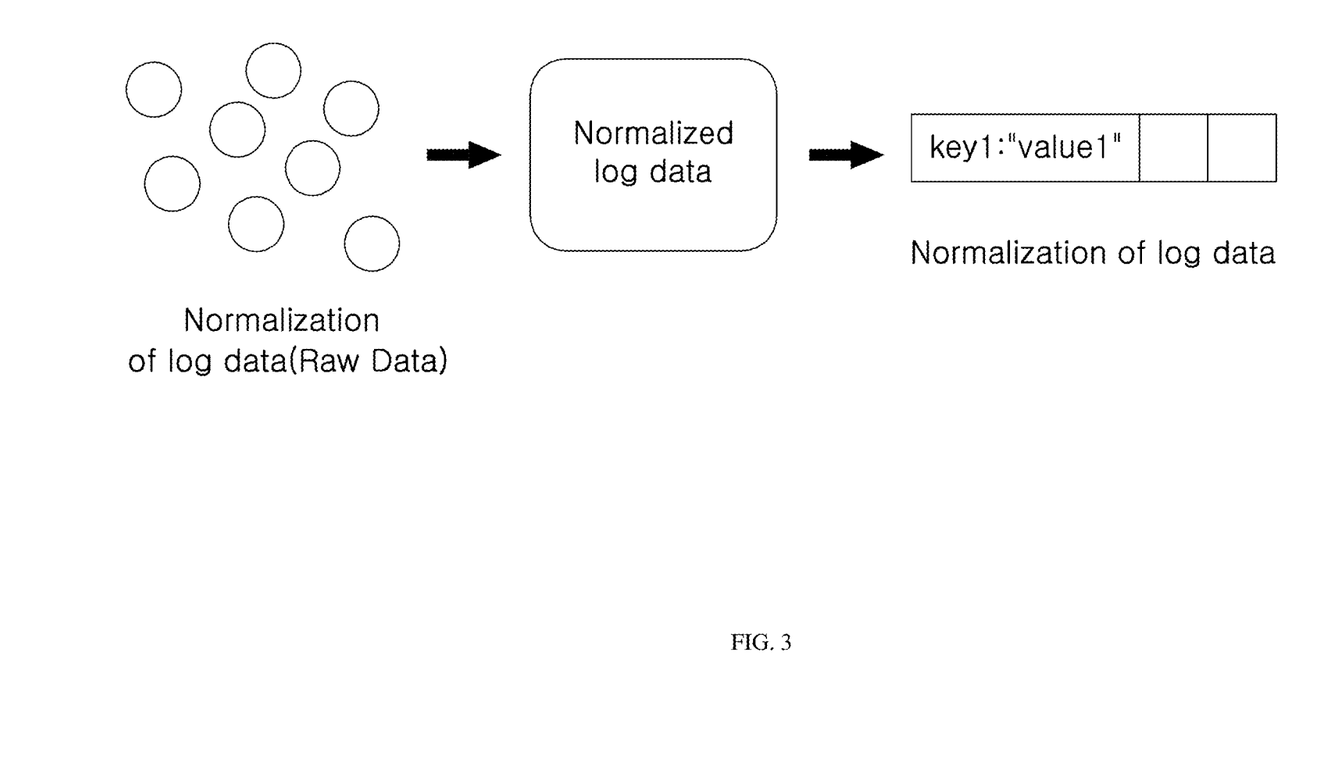
FIG. 3 illustrates the operation of an electronic apparatus according to one embodiment of the present disclosure for performing a normalization process on the log data to identify item-specific data.

Referring to FIG. 3 in relation to the description above, the normalization module 131 may perform normalization on the log data (raw data) collected in real-time and obtain log data normalized for each item. Here, the plurality of items constituting the normalized log data may be the items related to the conditions constituting the rules employed for threat detection by the threat detection module 133.

At this time, the log compression module 132 may obtain an item-specific hash value by applying the extracted item-specific data to the hash function corresponding to each item S220. The hash function may be preconfigured on the extended Bloom filter 111 for each item.

Then the log compression module 132 may check for the duplication of log data based on whether the item-specific hash value is duplicated S230.

For example, if each hash value of the plurality of items constituting the (normalized) log data is identified as matching each pre-stored, item-specific hash value of at least one prior log data, the log compression module 132 may determine the log data to be duplicated.

Also, the log compression module 132 may update the duplication count according to the checked duplication status S240.

Figure 4:
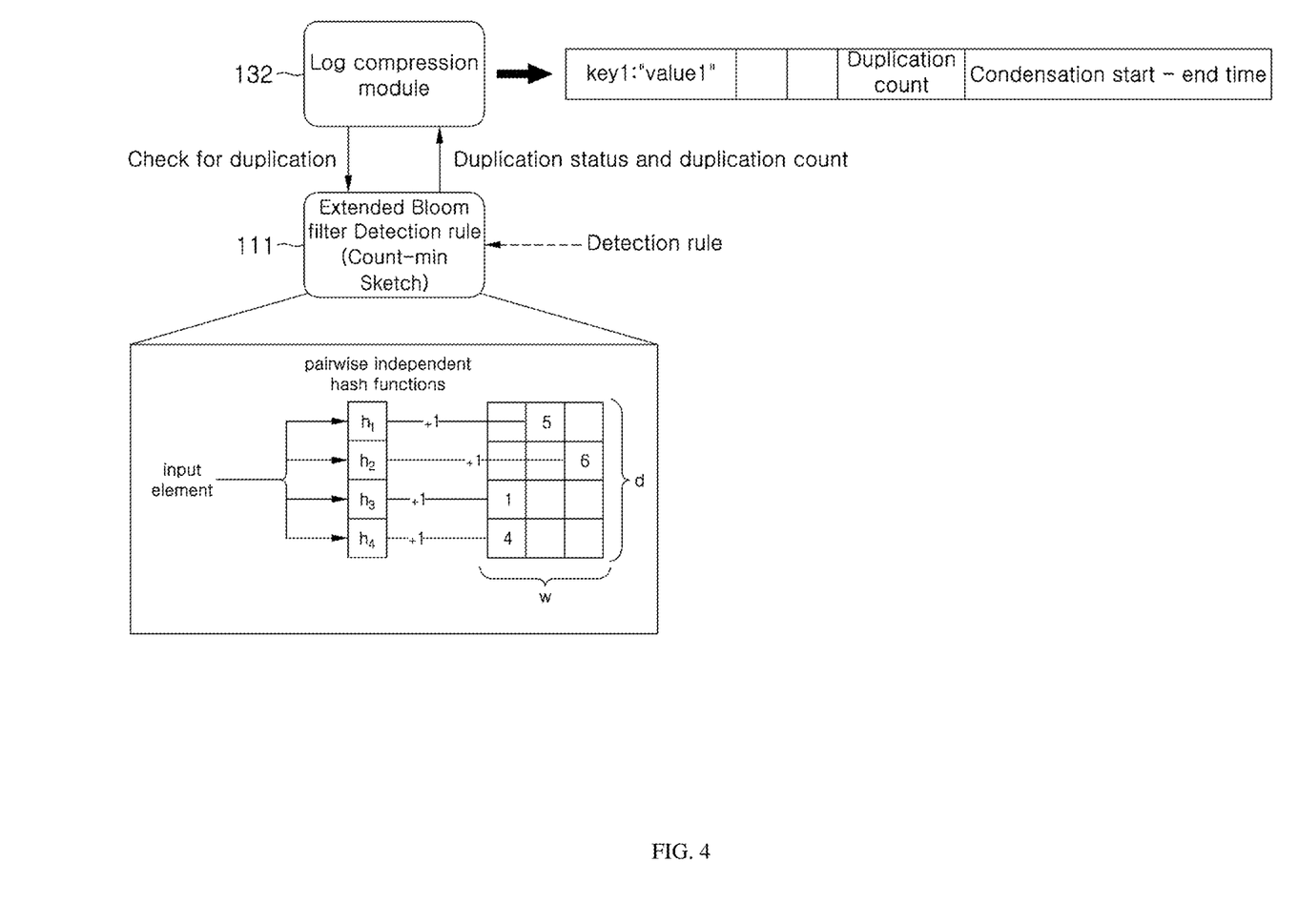
FIG. 4 illustrates the operation of an electronic apparatus according to one embodiment of the present disclosure for checking for duplication and compressing log data based on a duplication count.

Referring to FIG. 4 in relation to S220 to S240, the extended Bloom filter 111 may include a hash function for each item. Specifically, the extended Bloom filter 111 may include hash functions to be applied to each of a plurality of preconfigured items according to detection rules related to threat detection. Also, the extended Bloom filter 111 may store item-specific hash values of at least one prior log data.

Here, the log compression module 132 may input item-specific data matching each of a plurality of items constituting log data into the hash function of the extended Bloom filter 111 to determine the duplication of the log data based on whether the item-specific hash value is duplicated.

Specifically, the log compression module 132 may calculate separate hash functions h1, h2, h3, h4 for each item x1, x2, x3, x4 of the log data using the extended Bloom filter 111, mark the calculation results in a two-dimensional array, and determine whether all field values are non-zero. As described above, through the extended Bloom filter 111 configured as Count-Min Sketch, the log compression module 132 may count the number of duplicates of the log data within a predetermined period. In other words, the log compression module 132 may determine the frequency of duplications (count) in addition to the simple duplication check and add or delete the cached values (e.g., log data, duplication count, and so on).

As described above, if the duplication of log data is checked and the duplication count is updated, the threat detection module 133 may detect a threat based on the item-specific data of the log data and the updated duplication count S250.

Specifically, the threat detection module 133 may detect whether a threat is present based on the item-specific data of the log data and, if the data of each item satisfies a particular detection rule and thus identified as a threat, the degree of threat may be calculated according to the size of the duplication count.

In addition, the threat detection module 133 may perform rule-based detection of a threat according to two or more conditions of the log data, which correspond to different events (or conditions of item data constituting two or more log data) and calculate the degree of threat according to the number/frequency of duplications of each log data.

Meanwhile, in relation to the data structure of the extended Bloom filter 111 updated according to a predetermined period, the log compression module 132 may update the extended Bloom filter 111 or the duplication count according to the conditions of the duplication count.

Figure 5:
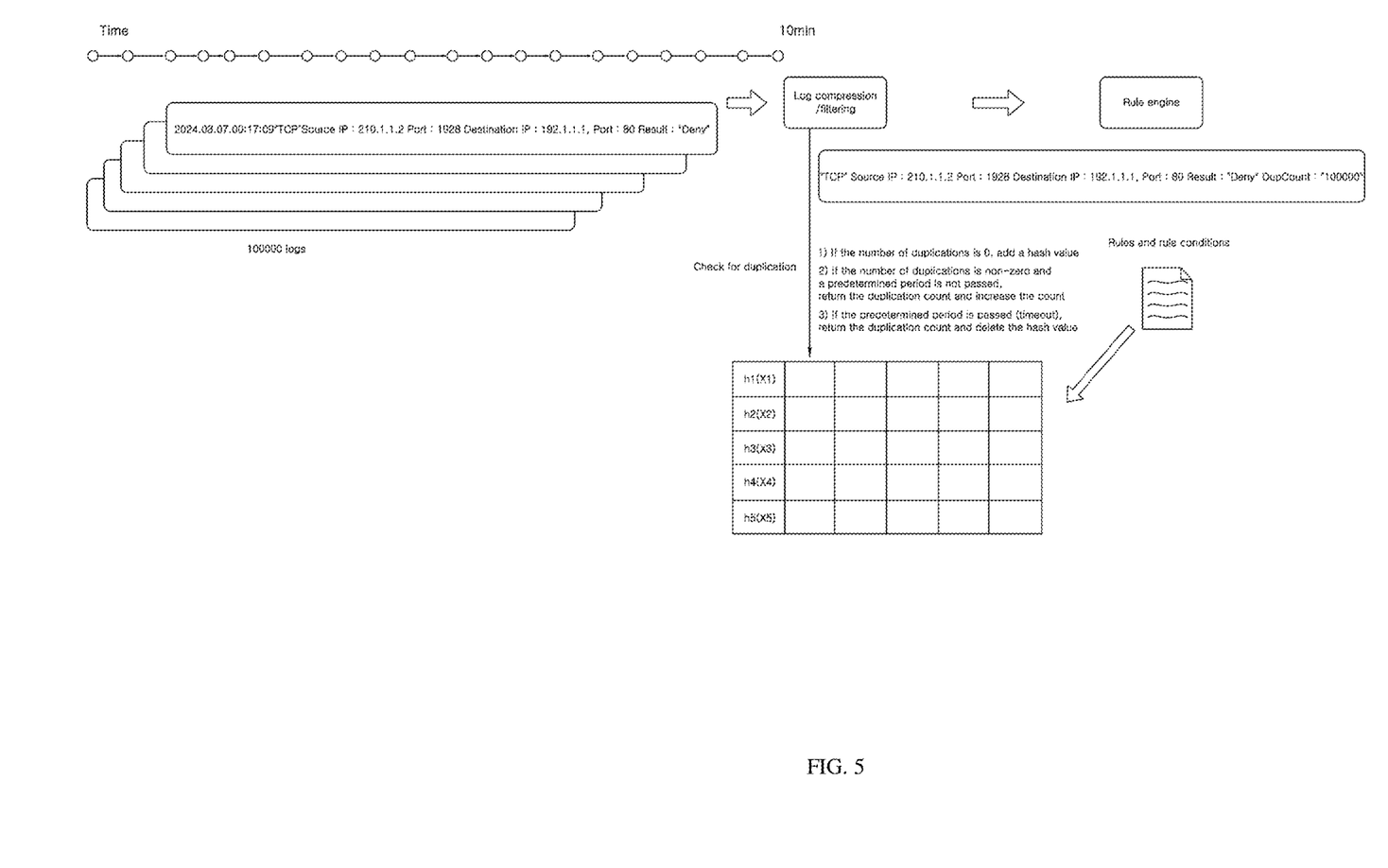
FIG. 5 illustrates a specific process of an electronic apparatus according to one embodiment of the present disclosure for compressing log data based on a duplication count.

In relation to the description above, FIG. 5 illustrates a specific process of an electronic apparatus according to one embodiment of the present disclosure for compressing log data based on a duplication count. FIG. 5 assumes that the same log data is repeated 100,000 times during a predetermined period (e.g., 10 min).

First, if the log data of FIG. 4 is first identified, the log compression module 132 may determine that each hash value of a plurality of items constituting the log data does not match each hash value of pre-stored items of at least one prior log data. In this case, the log compression module 132 may set the duplication count of the log data to one and store the hash value of each of the plurality of items constituting the log data into the extended Bloom filter 111.

It should be noted that, if the same log data is identified again, the log compression module 132 may determine that each of the plurality of items constituting the log data matches each of pre-stored item-specific hash values of at least one prior log data.

Here, if the duplication count is not zero and the predetermined period has not elapsed, the log compression module 132 may set the duplication count to increase and may not repeatedly store the duplicated log data. In this way, if the same log data is collected many times (e.g., 100,000 times) within a predetermined period, only the data related to unit log data and duplicated data may be stored, and the computational loads required for processing and storing of the data may be minimized.

The extended Bloom filter 111 may be initialized at predetermined intervals. Specifically, when a time point set according to the predetermined period is reached, the electronic apparatus 100 may return the duplication count of the log data within the extended Bloom filter 111 and delete the hash value of each of the plurality of items constituting the log data.

At this time, the predetermined period may correspond to the period at which the threat detection module 133 performs detection rule-based threat detection. Specifically, if a time point set according to the predetermined period is reached, the threat detection module 133 may detect a threat based on the log data and the duplication count of the log data.

In relation to FIG. 4, it is assumed that the detection rule of the threat detection module 133 specifies a situation in which 'a plurality of network access attempts occur (DDoS) from multiple source IPs to a specific destination IP within a predetermined period.' In this case, each item-specific data constituting log data (source IP (source.ip), destination IP (destination.ip), destination port (destination.port "80"), and protocol (protocol.type "TCP")) and duplication count are applied, and the threat detection module 133 may detect a threat corresponding to the DDoS attack.

In FIG. 4, in the case of conventional technology that does not employ the filtering of the log compression module 132 described in the present disclosure, each of 100,000 log data is applied to the rule-based examination of the threat detection module 133 and may cause an extremely large computational load; however, the electronic apparatus 100 according to the present disclosure is capable of threat detection based on only one log data and duplication count, which may minimize the computational load.

Meanwhile, in relation to the embodiment described above, where the item-specific hash value of each log data stored in the extended Bloom filter 111 is initialized (deleted) at predetermined intervals, and the threat detection module 133 performs threat detection, the electronic apparatus 100 according to one embodiment of the present disclosure may identify the number of (different) log data corresponding to the duplication count values larger than or equal to a predetermined number (e.g., 2) for each period and set the period to another value according to the number of identified log data.

Specifically, an average value of the number of log data having a duplication count larger than or equal to a predetermined value over a plurality of cycles (e.g., a preset number of cycles) may be calculated. Here, if the average value is larger than or equal to a first value, the electronic apparatus 100 may decrease the period in which the hash value of the extended Bloom filter 111 and the duplication count are initialized. On the other hand, if the average value is less than a second value, the electronic apparatus 100 may increase the period in which the hash value and the duplication count of the extended Bloom filter 111 are initialized. The second value may be smaller than the first value, and the first and second values correspond to the upper and lower limits for maintaining the period, respectively.

The period also serves as a period for the threat detection module 133 to detect a threat based on each item of the log data and the duplication count.

Considering the fact that the severity of a threat increases as the duplication count gets higher in the case of malicious logs, since the period for initializing the extended Bloom filter 111 according to the embodiment is updated, an advantageous effect is achieved that the load applied on the threat detection module 133 that detects a threat based on log data whose duplication count is larger than or equal to a predetermined number may be managed appropriately at each period.

Meanwhile, for the convenience of description, the embodiments above assume that the normalization module 131, the log compression module 132, the threat detection module 133 operate on one electronic apparatus 100; however, the operation of each module may be linked to each other and performed on two or more electronic apparatus constituting a single system.

Figure 6A:
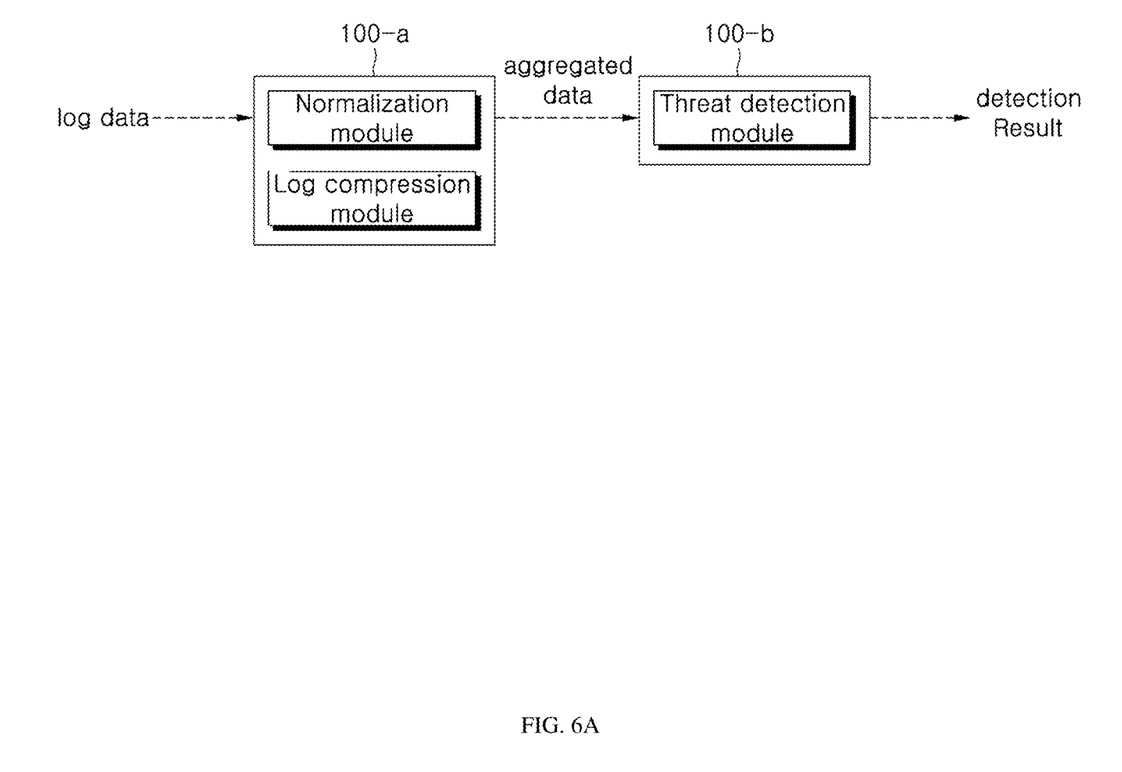
FIGS. 6A to 6B illustrate embodiments in which a system comprising a plurality of electronic apparatus perform the process of FIG. 2 described above.

In one embodiment, referring to FIG. 6A, the operations of the normalization module and the log compression module are performed on the electronic apparatus 100-$a$, while the operation of the threat detection module is performed on the electronic apparatus 100-$b$; in this way, the process illustrated in FIG. 2 may be performed on a system comprising a plurality of electronic apparatus.

Figure 6B:
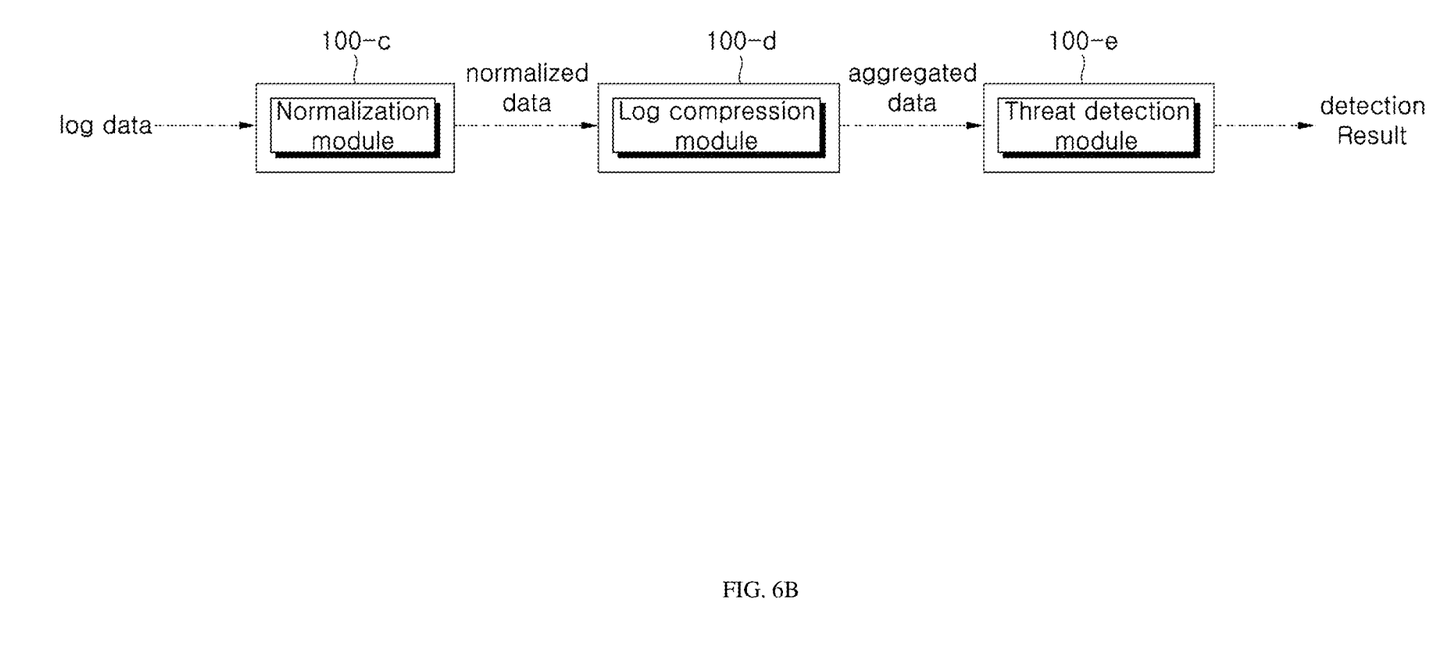

Also, in one embodiment, referring to FIG. 6B, it is still possible that the normalization module, log compression module, and threat detection module are operated by being included in the respective electronic apparatus 100-$c, d, e$.

Meanwhile, as long as there is no conflict or contradiction, two or more of the various embodiments described above may be combined and implemented together.

Meanwhile, the various embodiments described above may be implemented in a recording medium readable by a computer or similar device using software, hardware, or a combination thereof.

In a hardware implementation, the embodiments described in the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and other electrical units for performing functions.

In some cases, the embodiments of the present disclosure may be implemented within a processor itself. In the case of software implementation, the embodiments such as procedures and functions according to the present disclosure may be implemented by separate software modules. Each of the software modules may perform one or more functions and operations according to the present disclosure.

Meanwhile, computer instructions or computer programs for performing the processing operations in the electronic apparatus 100 according to the various embodiments of the present disclosure may be stored in a non-transitory computer-readable medium. When executed by a processor of a specific device, the computer instructions or computer programs stored in the non-transitory computer-readable medium cause the specific device to perform the processing operations in the electronic apparatus 100 according to the various embodiments described above.

The non-transitory computer-readable medium refers to a medium that stores data semi-permanently and that may be read by a machine, rather than a medium that stores data for a short time period such as a register, a cache, and a memory. Specific examples of the non-transitory computer-readable medium include a CD, a DVD, a hard disk, a Bluray disk, a USB memory, a memory card, and a ROM.

Throughout the document, preferred embodiments of the present disclosure have been described with reference to appended drawings; however, the present disclosure is not limited to the embodiments above. Rather, it should be noted that various modifications of the present disclosure may be made by those skilled in the art to which the present disclosure belongs without leaving the technical scope of the present disclosure defined by the appended claims, and these modifications should not be understood individually from the technical principles or perspectives of the present disclosure.

DETAILED DESCRIPTION OF MAIN ELEMENTS

100: Electronic apparatus
110: Memory
120: Communication interface
130: Processor
111: Extended Bloom filter
131: Normalization module
132: Log compression module
133: Threat detection module

What is claimed is:

1. An operation method of an electronic apparatus, the method comprising:
    extracting item-specific data that matches a plurality of preconfigured items from within log data by the electronic apparatus;
    applying the extracted item-specific data to a hash function corresponding to each item to obtain item-specific hash values and checking for duplication of the log data based on whether the item-specific hash values are duplicated by the electronic apparatus;
    updating a duplication count based on the checked duplication status by the electronic apparatus by the electronic apparatus; and
    detecting a threat based on the identified item-specific data and the updated duplication count by the electronic apparatus,
    wherein the checking for duplication of the log data inputs the item-specific hash values corresponding to each of the plurality of items that constitute the log data into an extended Bloom filter in which item-specific hash values of at least one prior log data are stored and identifies the duplication status of the log data based on whether each of item-specific hash values is duplicated,
    wherein the checking for duplication of the log data determines the log data as duplicated if each of the hash values of the plurality of items that constitute the log data is identified as matching the item-specific hash values of the prior log data,
    wherein the extended Bloom filter includes hash functions to be applied to each of the plurality of preconfigured items according to detection rules related to threat detection, and
    wherein the updating of the duplication count counts the number of times the log data, identified through the extended Bloom filter, is duplicated within a predetermined period.

2. The method of claim 1, wherein the updating of the duplication count counts the number of times the log data, identified through the extended Bloom filter, is duplicated within a predetermined period.

3. The method of claim 1, when each of the hash values of the plurality of items that constitute the log data is identified as not matching any pre-stored item-specific hash value of at least one prior log data, including setting the duplication count of the log data to one and storing the hash value of each of the plurality of items in the extended Bloom filter.

4. The method of claim 3, wherein the detecting of the threat detects a threat based on the log data and the duplication count of the log data when a time point set according to a predetermined period is reached.

5. The method of claim 4, wherein, when a time point set according to the predetermined period is reached, the method further comprises:
    returning the duplication count of the log data within the extended Bloom filter; and
    deleting the hash value of each of the plurality of items that constitute the log data.

6. A system comprising:
    a normalization module that extracts item-specific data matching a plurality of preconfigured items from log data;
    a log compression module that applies the extracted item-specific data to hash functions corresponding to each item to obtain item-specific hash values and checks for duplication of the log data based on whether the item-specific hash values are duplicated, and updates a duplication count based on the checked duplication status; and
    a threat detection module that detects threats based on the extracted item-specific data and the updated duplication count,
    wherein the log compression module inputs the item-specific hash values corresponding to each of the plurality of items that constitute the log data into an extended Bloom filter in which item-specific hash values of at least one prior log data are stored and identifies the duplication status of the log data as based on whether each of the item-specific hash values is duplicated,
    wherein the log compression module determines the log data as duplicated if each of the hash values of the plurality of items that constitute the log data is identified as matching the item-specific hash values of the prior log data, and
    wherein the extended Bloom filter includes hash functions to be applied to each of the plurality of preconfigured items according to detection rules related to threat detection and
    wherein the updating of the duplication count counts the number of times the log data, identified through the extended Bloom filter, is duplicated within a predetermined period.

* * * * *